(12) United States Patent
Harvey (10) Patent No.: US 11,743,069 B2
(45) Date of Patent: Aug. 29, 2023

(54) AUTOMATIC CONTROL METHOD OF GENERATING SUB-SYSTEMS AND SUB-SYSTEM ARBITRATION FROM THE DECONSTRUCTION OF A COMPLEX EQUIPMENT GRAPH

(71) Applicant: PassiveLogic, Inc., Holladay, UT (US)

(72) Inventor: Troy Aaron Harvey, Brighton, UT (US)

(73) Assignee: PASSIVELOGIC, INC., Holladay, UT (US)

( * ) Notice: Subject to any disclaimer, the term of this patent is extended or adjusted under 35 U.S.C. 154(b) by 0 days.

(21) Appl. No.: 17/867,657

(22) Filed: Jul. 18, 2022

(65) Prior Publication Data

US 2023/0006859 A1    Jan. 5, 2023

Related U.S. Application Data

(63) Continuation of application No. 16/921,924, filed on Jul. 6, 2020, now Pat. No. 11,394,574, which is a continuation of application No. 16/007,963, filed on Jun. 13, 2018, now Pat. No. 10,708,078.

(60) Provisional application No. 62/518,745, filed on Jun. 13, 2017.

(51) Int. Cl.
*H04L 12/28* (2006.01)
*G05B 15/02* (2006.01)

(52) U.S. Cl.
CPC .......... *H04L 12/2816* (2013.01); *G05B 15/02* (2013.01); *G05B 2219/2642* (2013.01)

(58) Field of Classification Search
CPC ................ H04L 12/2816; G05B 15/02; G05B 2219/2642
See application file for complete search history.

(56) References Cited

U.S. PATENT DOCUMENTS

| | | | | |
|---|---|---|---|---|
| 4,385,384 A * | 5/1983 | Rosbury | .................. | H04L 1/24 714/25 |
| 5,519,834 A * | 5/1996 | Kamerman | ........... | H04L 12/462 709/227 |
| 7,302,362 B2 * | 11/2007 | Misra | ....................... | H04Q 9/00 700/32 |
| 7,840,913 B1 * | 11/2010 | Agrawal | .................. | G06F 8/35 717/109 |
| 8,024,511 B2 * | 9/2011 | Weddle | ............... | G06F 13/1689 711/163 |
| 8,352,651 B2 * | 1/2013 | Parfitt | ................. | G05B 19/054 326/38 |
| 10,705,492 B2 * | 7/2020 | Harvey | .............. | G05B 13/0265 |

(Continued)

*Primary Examiner* — Ramesh B Patel
(74) *Attorney, Agent, or Firm* — Kunzler Bean & Adamson (57) ABSTRACT

Apparatuses, systems, methods, and computer program products are disclosed for organizing automatic control in automation systems from a system description, using deconstruction of complex equipment graphs. A system control scheme is automatically generated from a deconstruction of an equipment graph into controllable sets of prioritized sub-systems. An equipment graph comprises one or more subsystems of equipment. Prioritized sub-systems comprise a unique routing path through an equipment graph. Prioritized sub-systems comprise the ability to be actuated and are divided into groups of sub-system sets. Groups of sub-system sets comprise synchronous and asynchronous sets and are created for conjoined routing paths of parallel sub-systems.

20 Claims, 8 Drawing Sheets

(56) References Cited

U.S. PATENT DOCUMENTS

| | | | |
|---|---|---|---|
| 10,708,078 B2 * | 7/2020 | Harvey | H04L 12/2816 |
| 10,969,133 B2 * | 4/2021 | Harvey | G05B 13/0265 |
| 11,394,574 B2 * | 7/2022 | Harvey | H04L 12/2816 |
| 2005/0097161 A1 * | 5/2005 | Chiou | H04W 16/18 |
| | | | 709/200 |
| 2007/0055392 A1 * | 3/2007 | D'Amato | G05B 13/048 |
| | | | 700/44 |
| 2014/0288890 A1 * | 9/2014 | Khainson | G16H 40/20 |
| | | | 703/1 |
| 2014/0330611 A1 * | 11/2014 | Steven | G06F 17/10 |
| | | | 705/7.24 |
| 2015/0025917 A1 * | 1/2015 | Stempora | G02B 27/0093 |
| | | | 705/4 |
| 2017/0171580 A1 * | 6/2017 | Hirsch | H04L 67/62 |
| 2017/0289191 A1 * | 10/2017 | Thioux | H04L 63/1441 |
| 2017/0315696 A1 * | 11/2017 | Jacobson | G06F 3/048 |
| 2017/0329289 A1 * | 11/2017 | Kohn | F24F 11/46 |
| 2018/0335759 A1 * | 11/2018 | Harvey | G05B 15/02 |
| 2018/0359111 A1 * | 12/2018 | Harvey | H04L 12/2816 |
| 2023/0006859 A1 * | 1/2023 | Harvey | H04L 12/2816 |

* cited by examiner

AUTOMATIC CONTROL METHOD OF GENERATING SUB-SYSTEMS AND SUB-SYSTEM ARBITRATION FROM THE DECONSTRUCTION OF A COMPLEX EQUIPMENT GRAPH

CROSS REFERENCES TO RELATED APPLICATIONS

This application is a continuation of U.S. patent application Ser. No. 16/921,924 entitled "AN AUTOMATIC CONTROL METHOD OF GENERATING SUB-SYSTEMS AND SUB-SYSTEM ARBITRATION FROM THE DECONSTRUCTION OF A COMPLEX EQUIPMENT GRAPH" and filed on Jul. 6, 2020 for Troy Aaron Harvey, which is a continuation of U.S. patent application Ser. No. 16/007,963 entitled "AN AUTOMATIC CONTROL METHOD OF GENERATING SUB-SYSTEMS AND SUB-SYSTEM ARBITRATION FROM THE DECONSTRUCTION OF A COMPLEX EQUIPMENT GRAPH" and filed on Jun. 12, 2018 for Troy Aaron Harvey, which claims the benefit of U.S. Provisional Patent Application No. 62/518,745 entitled "AN AUTOMATIC CONTROL METHOD OF GENERATING SUB-SYSTEMS AND SUB-SYSTEM ARBITRATION FROM THE DECONSTRUCTION OF A COMPLEX EQUIPMENT GRAPH" and filed on Jun. 12, 2017 for Troy Aaron Harvey, each of which are incorporated herein by reference in their entirety for all purposes.

FIELD

The present disclosure relates to control of building systems using automated means. More specifically, the present disclosure relates to an automated method of deconstructing a graph representing building systems equipment and connections into sub-systems. The present disclosure particularly addresses the control and automation of HVAC, energy, lighting, irrigation systems, and the like.

BACKGROUND

Modern buildings contain a varied and complex set of systems for managing and maintaining the building environment. Building automation systems are used to automate the control of many separate systems, such as those used for lighting, climate, security, entertainment, etc. Building automation systems can perform a number of functions, such as automation of equipment scheduling, monitoring of various building parameters, optimization of resource consumption, event or alarm reporting and handling, and many others.

Building automation system implementation requires programmatic understanding of what equipment is available to the building automation system and how that equipment may be utilized. For example, the building automation system needs to account for information such as what equipment can be run simultaneously, what groups of equipment work together to achieve a particular objective, etc. Automatic discovery of this information is challenging with current methodologies.

SUMMARY

The present disclosure provides a method of automatically decomposing a complex graph of connected equipment into equipment sub-systems for the purpose of automatic labeling of automatable systems, sub-system, and the equipment therein for machine-driven control. Further the present disclosure relates to user interfaces that allow a user to draw a graph of equipment having n-complexity and n-number of routing paths, and decompose that drawing into a controllable system of atomic sub-systems automatically.

The present disclosure describes a method for the decomposition of sub-systems to automatically infer controllability, ranking, prioritization, and analyzing the sub-systems to identify those that are unique and complete, categorizing sub-systems into synchronous groups (in which only a single sub-system can operate at a time), and asynchronous groups (in which more than one sub-system can operate simultaneously).

The present disclosure details how building automation system would automatically provide semantic labeling for the sub-system and its equipment for retrieval during an analytic stage.

The present disclosure also relates to the automatic reduction of state space in a n-complexity graph of equipment. By using the semantic labeling together with the deconstructed set of meaningful sub-systems, the meaningful control state space of the system can be derived.

There has thus been outlined, rather broadly, the features of the disclosure in order that the detailed description thereof that follows may be better understood and in order that the present contribution to the art may be better appreciated. Numerous objects, features and advantages of the present disclosure will be readily apparent to those of ordinary skill in the art upon a reading of the following detailed description of presently preferred, but nonetheless illustrative, embodiments of the present disclosure when taken in conjunction with the accompanying drawings. The disclosure is capable of other embodiments and of being practiced and carried out in various ways. Also, it is to be understood that the phraseology and terminology employed herein are for the purpose of descriptions and should not be regarded as limiting.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptions or variations of the present disclosure.

This section summarizes some aspects of the present disclosure and briefly introduces some preferred embodiments. Simplifications or omissions in this section as well as in the abstract or the title of this description may be made to avoid obscuring the purpose of this section, the abstract, and the title. Such simplifications or omissions are not intended to limit the scope of the present disclosure nor imply any limitations.

Several advantages of one or more aspects of the present disclosure include but are not limited to: to generate a system control scheme automatically from a complex equipment graph; to decompose automatically the equipment graph into sub-system sets, where the decomposition enables the generation of a system control scheme; to enable automatic semantic reasoning about the generation of said system control scheme from the decomposition, thereby enabling more efficient generation of the control scheme as well as increasing human reasoning of the control scheme generation process; to automatically select valid and unique equipment sub-systems from said decomposition, thereby reducing the control scheme search space so as to increase control path search efficiency; to enable automatic prioritization of sub-systems, thereby enabling the generation of a system control scheme that responds to system preferences and priorities; to classify automatically sub-systems as either asynchronous or synchronous, thereby enabling the generation of a control scheme that responds to precedence and sequential operation limitations of particular equipment and sets of equipment. Other advantages of one or more aspects of the disclosed method will be apparent from consideration of the following drawings and description.

DESCRIPTION OF DRAWINGS

To further clarify various aspects of some example embodiments of the present disclosure, a more particular description of the disclosure will be rendered by reference to specific embodiments thereof that are illustrated in the appended drawings. It is appreciated that the drawings depict only illustrated embodiments of the disclosure and are therefore not to be considered limiting of its scope. The disclosure will be described and explained with additional specificity and detail through the use of the accompanying drawings in which.

REFERENCE NUMERALS

The following conventions are used for reference numerals: the first digit indicates the figure in which the numbered part first appears (the first two digits are used for the figure number when required). The remaining digits are used to identify the part in the drawing.

301 solar thermal hot water panel
302 heating source
303 transport
304 transport
305 store (virtual heat source)
306 mixer
307 transport
308 load/system head
309 router
310 router
311 cooling source
401 valid sub-system column
402 invalid sub-system column
403 duplicate sub-system column
501 sub-system 1
502 sub-system 2
503 sub-system 3
504 sub-system 4
505 sub-system 5

DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The following embodiments and the accompanying drawings, which are incorporated into and form part of this disclosure, illustrate embodiments of the disclosure and together with the description, serve to explain the principles of the disclosure. To the accomplishment of the foregoing and related ends, certain illustrative aspects of the disclosure are described herein in connection with the following description and the annexed drawings. These aspects are indicative, however of, but a few of the various ways in which the principles of the disclosure can be employed and the subject disclosure is intended to include all such aspects and their equivalents. Other advantages and novel features of the disclosure will become apparent from the following detailed description of the disclosure when considered in conjunction with the drawings.

Explanation will be made below with reference to the aforementioned figures for illustrative embodiments concerning the present invention.

Figure 1:
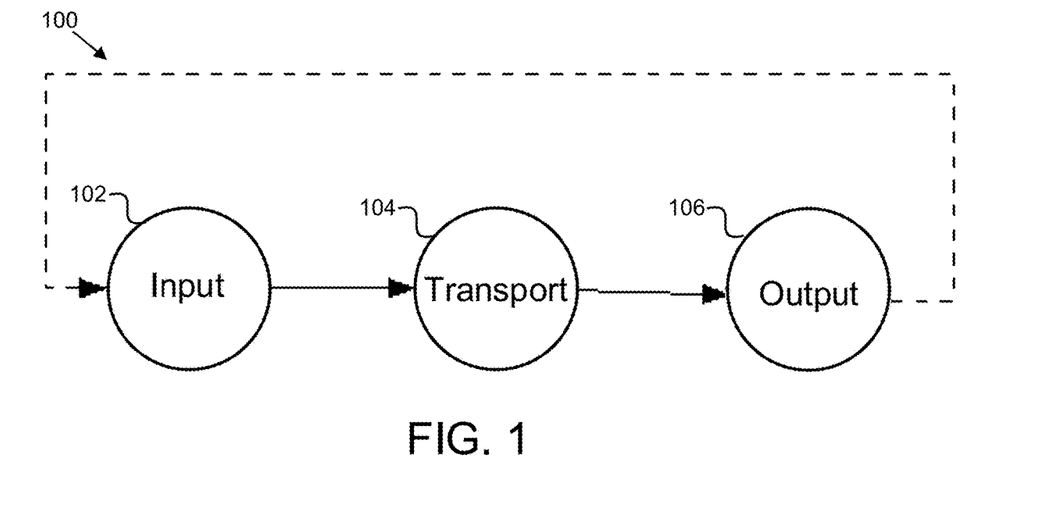
FIG. 1 depicts one embodiment of a base sub-system structure in accordance with the subject matter described herein.

The present disclosure describes a method of decomposing a system of interconnected equipment into various sets of equipment comprising various sub-systems. The basic structure of such a sub-system 100 is shown in FIG. 1. A sub-system 100 comprises: an input 102, or a source of the relevant resource; a transport 104, whereby said relevant resource is transported; and an output 106, or sink of said relevant resource. For example, in one embodiment, a sub-system 100 may have as an input 102 a heating source, a water pump as a transport 104, and an output 106 of a hot water storage tank. The transport 104 moves water from the heating source to the output 106 hot water storage tank.

Figure 2:
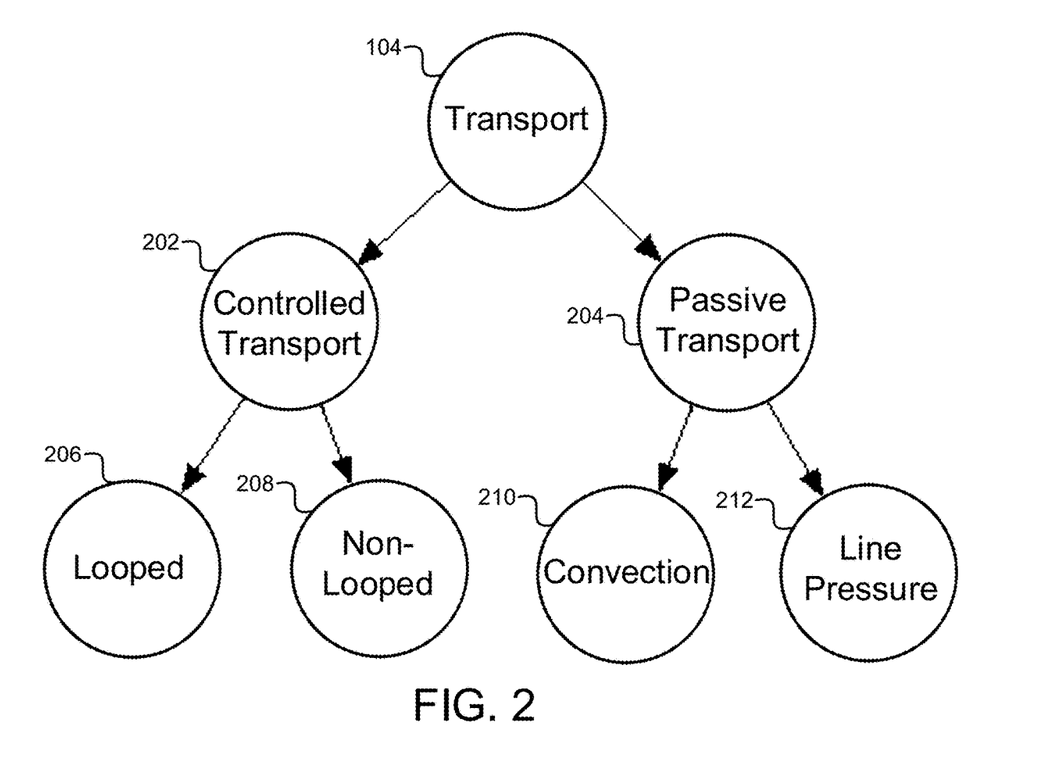
FIG. 2 depicts one embodiment of transport class detail in accordance with the subject matter described herein.

In various embodiments, an equipment sub-system 100 transport 104 may use various means. As shown in FIG. 2, in one embodiment, the transport 104 may be controlled 202 and either looped 206 or non-looped 208; or passive 204, and may use either convection 210 or line-pressure 212 as a means of transport 104. The transport element 104 of a sub-system 100 may consist of one or multiple transport devices 104.

Figure 3:
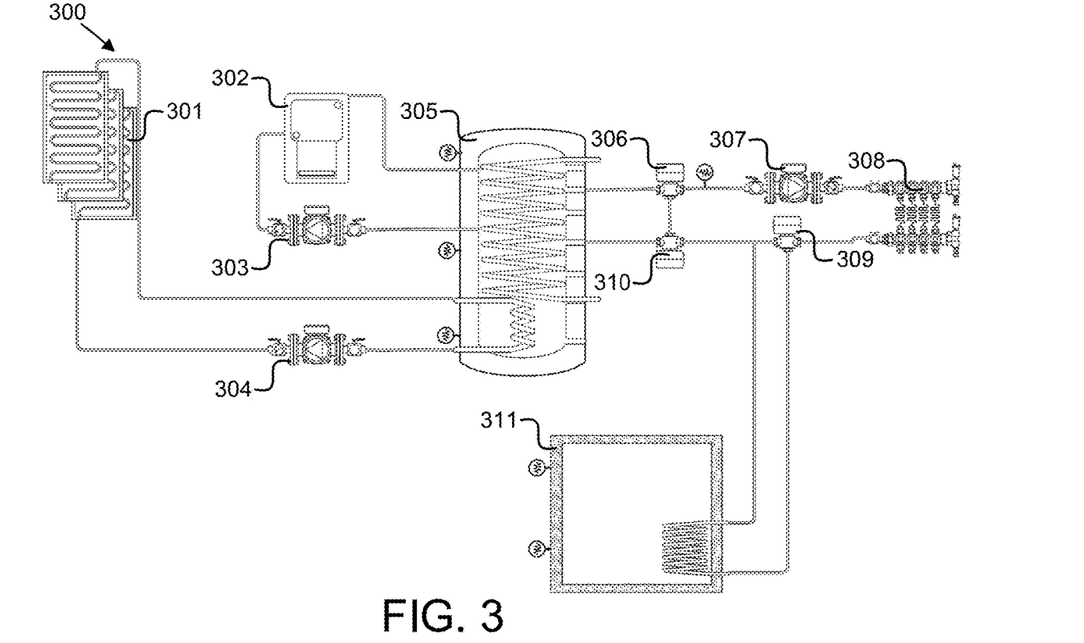
FIG. 3 depicts one embodiment of an example graphical system model in accordance with the subject matter described herein.

FIG. 3 shows an example embodiment of a graphical representation of a system 300 of interconnected equipment. In this embodiment, the load/system head 308 connects via transport 307 into store 305. From the store 305, transport paths exist to a cooling source 311 or to load 308, via mixer 306. The illustrated system 300 also contains loops between store 305 through heating source 302 with an explicit transport 303, as well as between store 305 and solar thermal hot-water panel 301 with an explicit transport 304.

A sub-system is classified as synchronous when said sub-system routing paths are conjoined in an manner that only one sub-system may operate at a time; and a sub-system is classified as asynchronous when said sub-system routing paths are conjoined in a manner that two or more sub-systems may operate at the same time.

Figure 4:
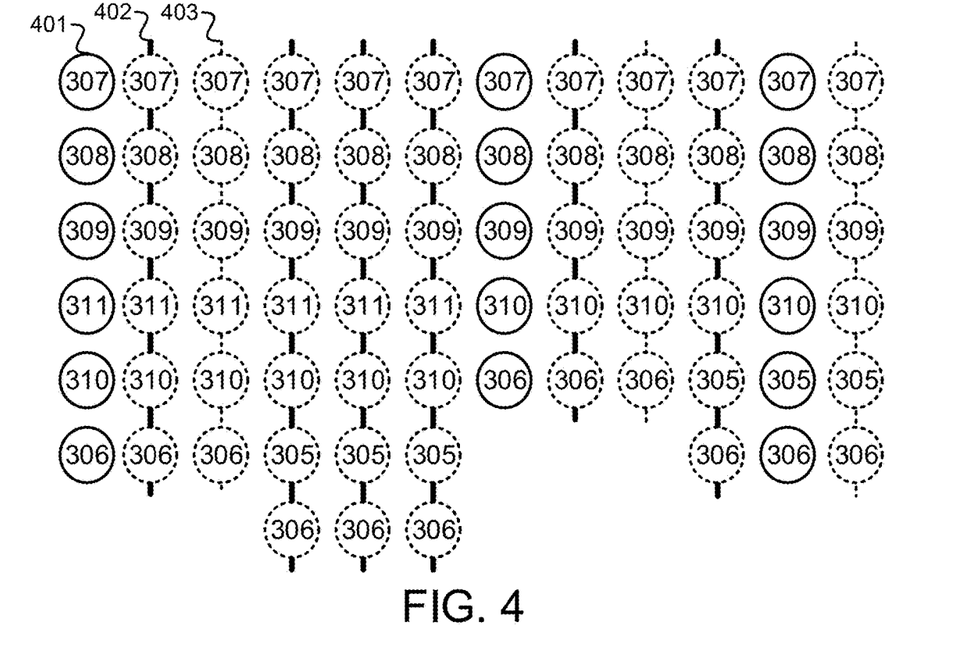
FIG. 4 depicts one embodiment of permutations of the example graphical system model in accordance with the subject matter described herein.

The decomposition process of a system may be accomplished by recognizing and extracting sub-systems from the system graph. Sub-system reduction to atomic sub-systems having a known equipment topology enable a machine learning engine to reason about the system and control the system in a uniform expected manner. (FIG. 4). A sub-system may be defined as starting at a source and ending at a sink. Resources are capable of supplying one or multiple sinks. Transports may split into multiple paths to other transports or multiple outputs and each path may be identified as a branch. Branches may be classified into one or multiple synchronous or asynchronous sub-systems. The process may also enforce specified design rules for sub-system and component recognition and extraction.

The decomposition process may also recognize characteristics of or relationships between sub-systems, such as deriving sub-system or branch type. The process may identify the sub-system as either synchronous or asynchronous based on the equipment and sub-system characteristics and capabilities. The process may also identify sub-systems with attributes like priority and precedence. For example, sub-systems may be organized in asynchronous and synchronous groups.

The process may also organize the whole deconstructed graph of systems, sub-systems, and equipment into structured maps, trees, or sets which can represent unions based on asynchronous and synchronous groups, or other characteristics.

Application of the methodology may yield sets of equipment that constitute the various sub-systems in the given system. FIG. 4 illustrates some of the equipment sub-systems that may be recognized, analyzed, and derived using the method described above from the example system in FIG. 3 (note that not all possible sub-systems are shown, for ease of illustration and readability). Individual pieces of equipment are represented as circles, containing the reference numeral of the corresponding piece of equipment. An individual sub-system is represented by a column 401, 402, 403 of equipment pieces. Sub-systems that are not faded or crossed out, such as column 401, are those sub-systems resulting from the decomposition process that are both unique and complete. Sub-systems that are faded and crossed out with a solid line, such as column 402, are those sub-systems that were identified in the decomposition process as being incomplete, for example, not having the required equipment as required in FIG. 3. Sub-systems that are faded and crossed out with a dashed line, such as column 403, are those sub-systems that were identified in the decomposition process as a duplicate system.

Figure 5:
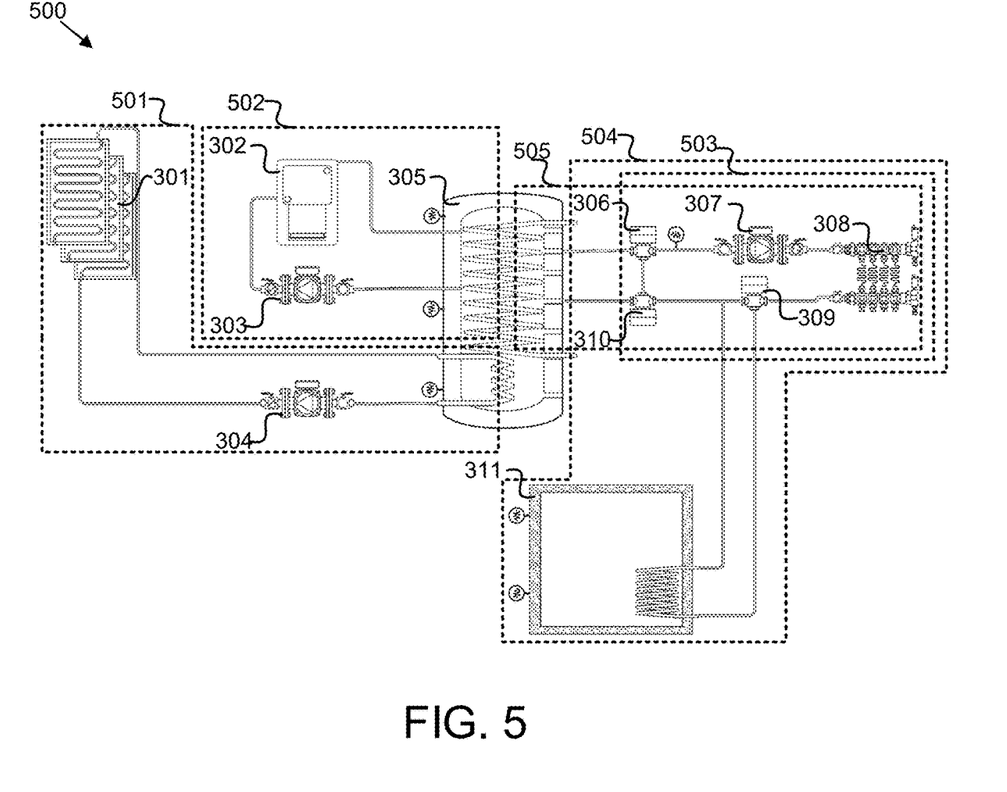
FIG. 5 depicts one embodiment of an example system model with sub-system overlay in accordance with the subject matter described herein.

Having executed the decomposition process, the sub-systems comprising a particular system may be classified. FIG. 5 shows the example system from FIG. 3 with all complete and unique sub-systems 501, 502, 503, 504, 505 overlaid on the system diagram.

Figure 6:
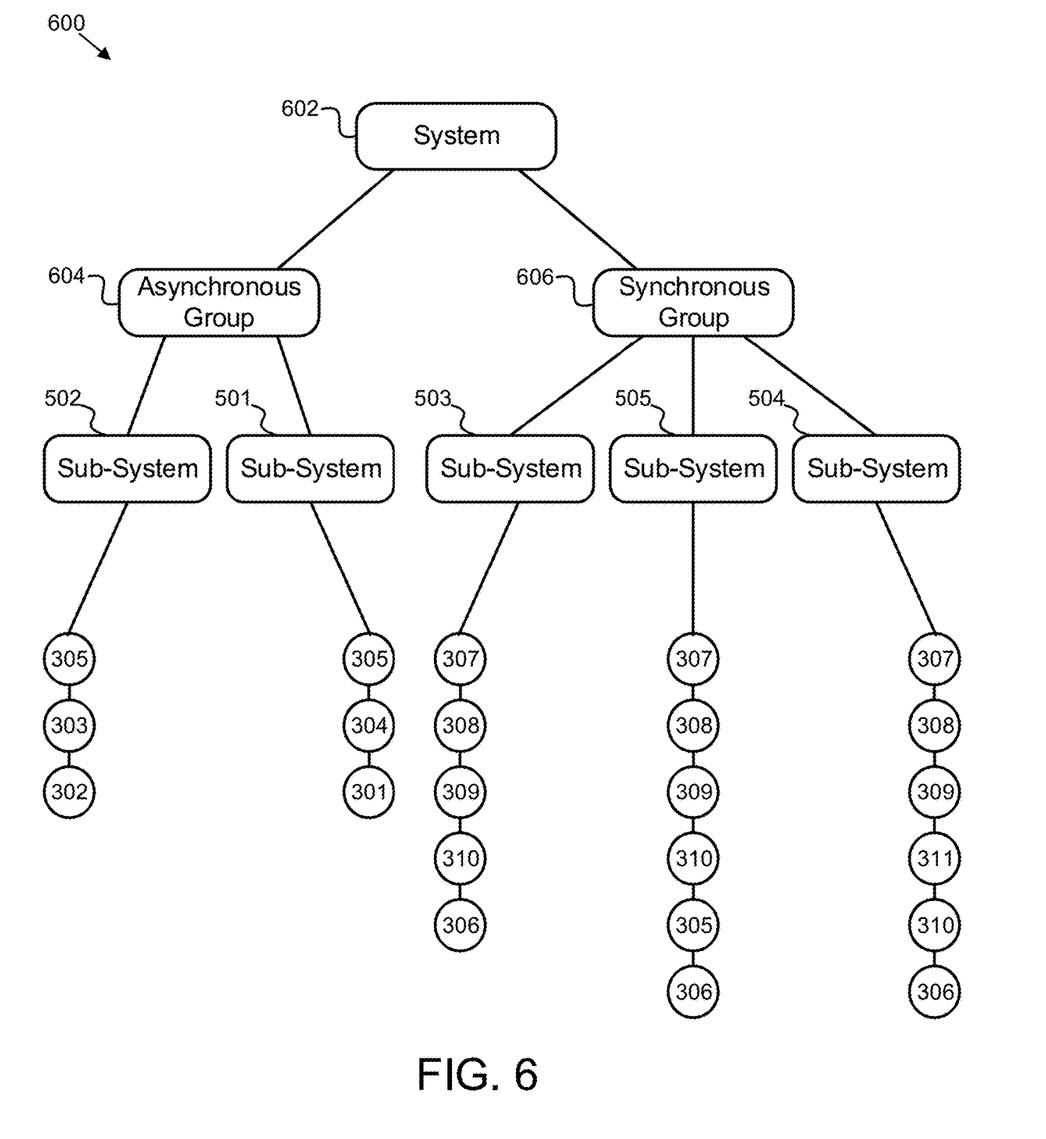
FIG. 6 depicts one embodiment of decomposition of an example system model classification into groups in accordance with the subject matter described herein.

As part of the decomposition process, sub-systems may be classified as either asynchronous or synchronous. FIG. 6 illustrates how the five unique, complete subsystems 501, 502, 503, 504, 505 derived from the whole system illustrated in FIG. 3 and FIG. 5 are classified. As shown, sub-systems 501 and 502 are asynchronous, and may be run simultaneously. Sub-systems 503, 504, and 505 are synchronous and must be run one at a time.

Figure 7:
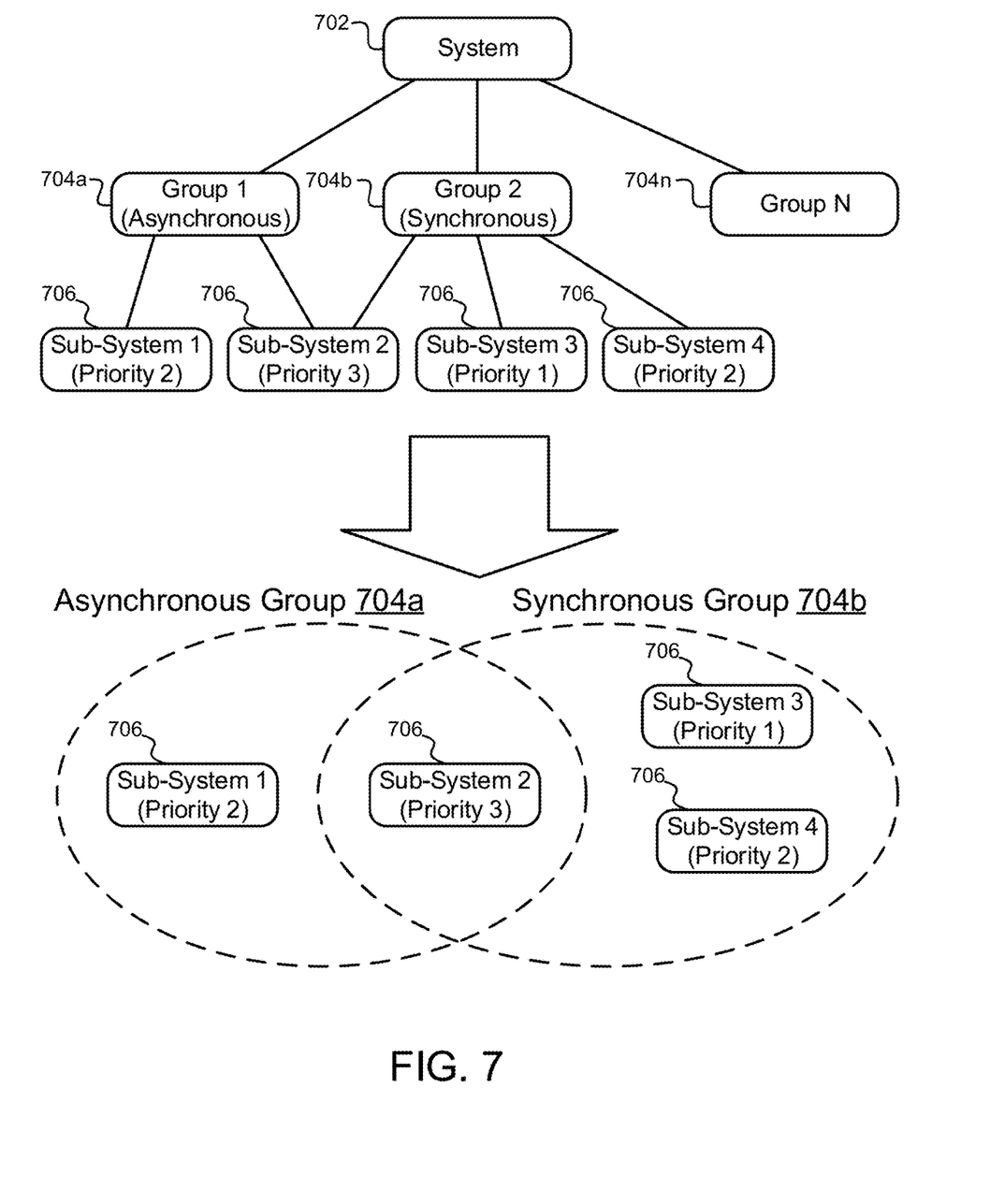
FIG. 7 depicts one embodiment of decomposition of an arbitrary system into groups with priorities in accordance with the subject matter described herein.

A controlled system 702 may have any number of groups of sub-systems 706 representing any number and variety of characteristics. An illustration of one embodiment of how equipment sub-systems 706 may be grouped 704 and classified is shown in FIG. 7. A Sub-system 706 may belong to one or multiple groups 704a-n. For example, in the embodiment illustrated in FIG. 7 sub-system 2 belongs to both an asynchronous group 704a and a synchronous group 704b.

A controlled system 500 having multiple sub-systems 501, 502, 503, 504, 505 can further be deconstructed in such a way that the equipment or system states required to initialize the sub-system 501, 502, 503, 504, 505 are pre-computed. An embodiment is shown in FIG. 5, where the path routing devices 310, 306, 309 (in this case valves) are pre-computed for each of the 5 sub-systems 501, 502, 503, 504, 505 shown, reducing the managed state space. A controller thus knows the necessary starting state before performing a control action heuristic on the remaining and smaller state space.

Another embodiment of the present disclosure is for the purpose of semantic extraction. By decomposing systems into atomic sub-systems comprising the necessary components of source, sink, and transport, a control system may automatically control and manage these system components in a rule-based way. The controller may also apply meaning to a sub-system by means of classification or rule tables. These classifications and/or rules may be used to generate semantics for the system, the sub-systems, and the constituent parts. An embodiment can be seen in FIG. 5, wherein sub-system 501 may be labeled as a "solar sub-system" based on the resource of its source component. In another embodiment, the same sub-system 501 may be labeled as a "heat-to-storage" system classification, based on its producer consumer purpose. In another embodiment, it may be labeled as a "heating system", based on the classification of its sub-system 501. Many embodiments of semantic labeling are possible given a rule-based deconstruction of atomic sub-systems from a graph.

A graphical user interface 802 may be used to input or drive the creation of an equipment graph 804, such that an electronic device having a screen may be used to automatically deconstruct a controllable system from the graphical representation 802 of the controllable system, the equipment objects, sets, priority, and their relationships. An embodiment of such a device can be seen in FIG. 8. Other methods may be used, such as importing a HVAC, mechanical, architectural, and/or engineering drawings or files.

Figure 9:
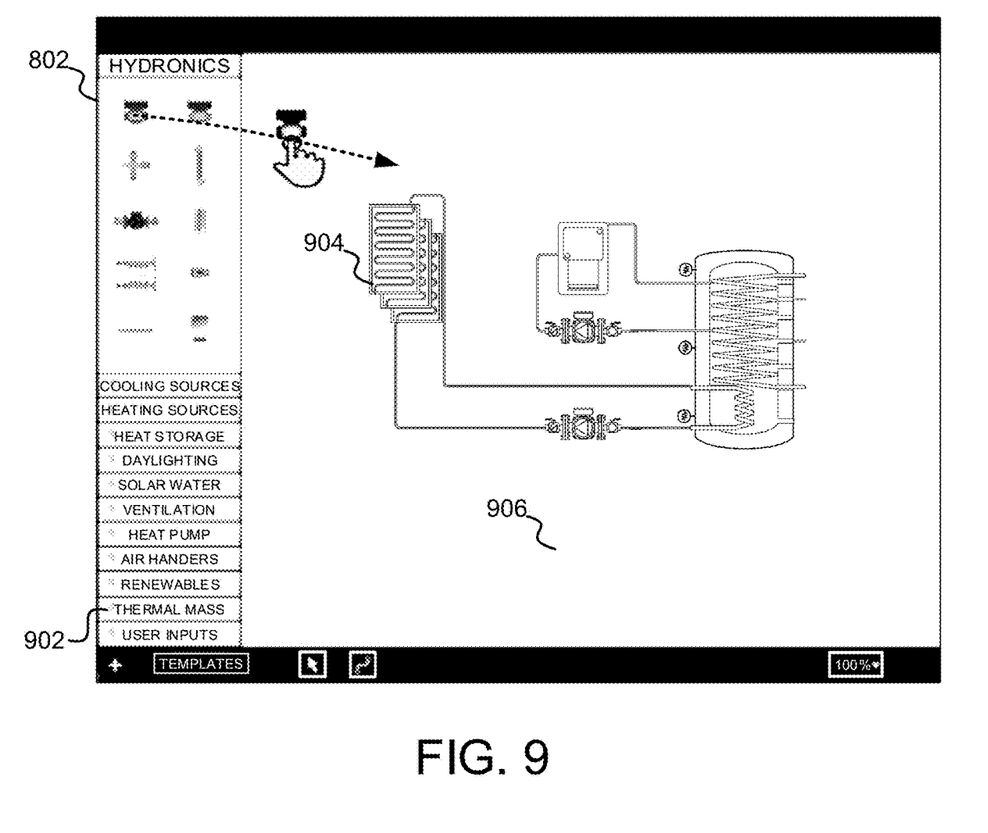
FIG. 9 depicts an embodiment of a graphical user interface drawing device in accordance with the subject matter described herein.

In some graphical user interface 802 embodiments having an electronic display, a user may drag and drop or instantiate equipment objects from an equipment object library 902 into a system drawing 904 on a drawing screen 906, either on a touchscreen, cursor driven input device, or other means. An embodiment can be seen in FIG. 9. Or the user can also create new equipment objects through drawing from fundamentals.

Figure 8:
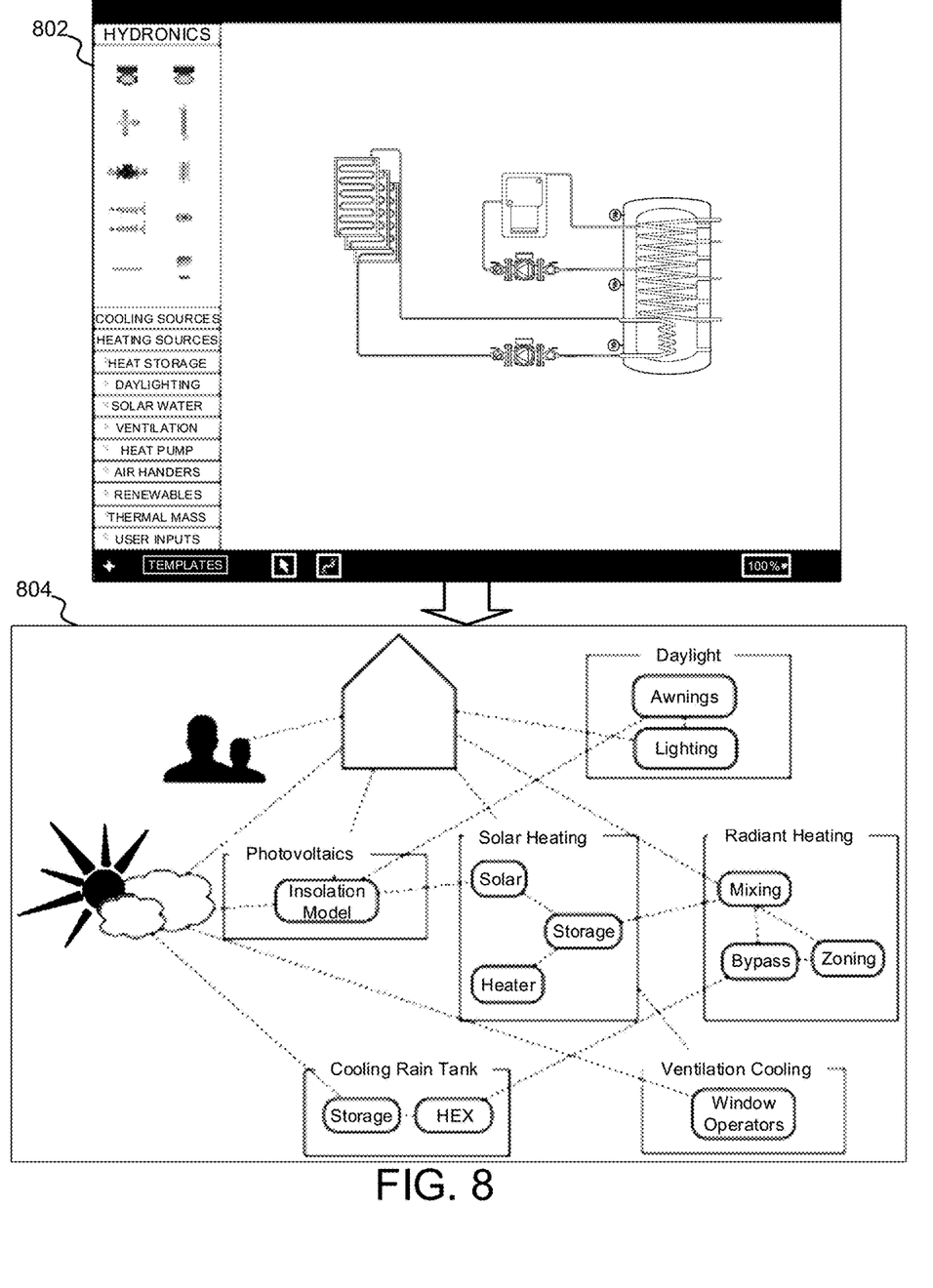
FIG. 8 depicts one embodiment of a graphical user interface and deconstructed sub-system graph in accordance with the subject matter described herein.

These drawings 904, made in situ or a-priori, can be disaggregated using the above methods into a graph 804 of sub-systems, priority, sub-system synchronicity, labeling, and the underlying control knowledge required to control the system in an unsupervised manner. An embodiment can be seen in FIG. 8, showing a hierarchal graph 804 of sub-systems.

Figure 10:
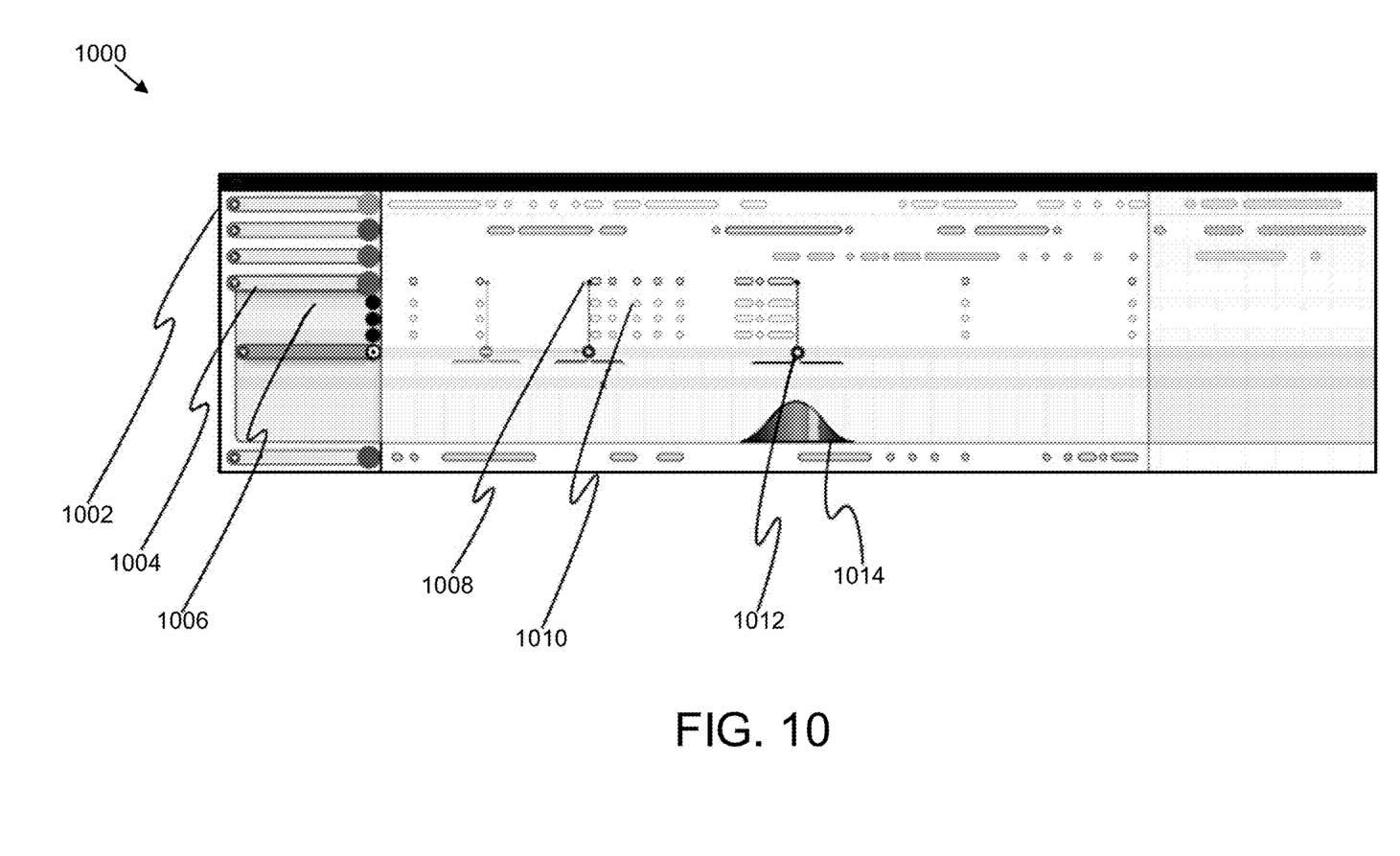
FIG. 10 depicts an embodiment of semantic analytics in accordance with the subject matter described herein.

These deconstructed graphs 804 of sub-system 1002 and their semantic labeling 1004 can be used to generate automatic analytics 1008, 1010, 1012, 1014 as in the embodiment in FIG. 10. In some embodiments the graphical display 1000 of equipment state and sensor values may be graphed in a time series labeled from the automated semantic extraction 1004 from the sub-systems 1002. Some embodiments of semantic labeling 1004 may take the form of a sub-system labeling 1004 by system purpose. In some embodiments, the system purpose may be extracted from its source equipment label, source-sink label, source-transport-sink label, the classified family of sub-system defined by those atomic attributes, and/or any other extracted attributes, labels, classifications, or other identifiers of its constituent equipment.

In some embodiments, the sub-system semantics 1004 may provide analytic display or graph grouping of equipment automatically, as in the embodiment in FIG. 10. In addition, as is shown in FIG. 10 such automatic labeling 1004 can correlate equipment actions 1012 and system actions 1008 with the corresponding sub-system 1004 without requiring manual programming.

The foregoing disclosure describes some possible embodiments of this invention, with no indication of preference to the particular embodiment. A skilled practitioner of the art will find alternative embodiments readily apparent from the previous drawings and discussion and will acknowledge that various modifications can be made without departure from the scope of the invention disclosed herein.

I claim:

1. A controller for controlling a controlled system, the controller comprising:
    a memory; and
    a processor in communication with the memory and configured to:
        receive a definition of an equipment graph representing a plurality of controllable devices;
        process the equipment graph to identify a plurality of equipment sub-systems within the equipment graph;
        identify a set of control actions issuable to at least one of the plurality of controllable devices for controlling at least one of the plurality of equipment sub-systems; and
        issue control actions from the set of control actions to the at least one of the plurality of controllable devices.

2. The controller of claim 1, wherein, in receiving the definition of the equipment graph, the processor is configured to receive a drawing file descriptive of the plurality of controllable devices.

3. The controller of claim 1, wherein, in receiving the definition of the equipment graph, the processor is configured to provide, via a display device, a user interface capable of receiving a manual definition of the equipment graph from the user.

4. The controller of claim 3, wherein the user interface provides an equipment object library to the user for selection of equipment objects to build the equipment graph.

5. The controller of claim 1, wherein, in identifying a set of control actions, the processor is configured to precomputing a state space for the plurality of equipment sub-systems.

6. The controller of claim 1, wherein, in processing the equipment graph, the processor is configured to identify the plurality of equipment sub-systems by:
    identifying a source component in the equipment graph;
    identifying a sink component in the equipment graph;
    finding a path from the source component through at least one transport component to the sink component in the equipment graph; and
    designating the source component, the sink component, and the at least one transport component as an equipment sub-system.

7. The controller of claim 1, wherein the processor is configured to semantically label the plurality of sub-systems by selecting a human-readable label for an equipment sub-system of the plurality of sub-systems based on at least one equipment component of the equipment subsystem.

8. A method for controlling a controlled system, the method comprising:
    receiving a definition of an equipment graph representing a plurality of controllable devices;
    processing the equipment graph to identify a plurality of equipment sub-systems within the equipment graph;
    identifying a set of control actions issuable to at least one of the plurality of controllable devices for controlling at least one of the plurality of equipment sub-systems; and
    issuing control actions from the set of control actions to the at least one of the plurality of controllable devices.

9. The method of claim 8, wherein the step of receiving the definition of an equipment graph comprises receiving a drawing file descriptive of the plurality of controllable devices.

10. The method of claim 8, wherein the step of receiving the definition of an equipment graph comprises receiving via a user interface a manual definition of the equipment graph from the user.

11. The method of claim 10, wherein the user interface provides an equipment object library to the user for selection of equipment objects to build the equipment graph.

12. The method of claim 8, wherein the step of identifying a set of control actions comprises precomputing a state space for the plurality of equipment sub-systems.

13. The method of claim 8, wherein the step of processing the equipment graph comprises identifying the plurality of equipment sub-systems by:
    identifying a source component in the equipment graph;
    identifying a sink component in the equipment graph;
    finding a path from the source component through at least one transport component to the sink component in the equipment graph; and
    designating the source component, the sink component, and the at least one transport component as an equipment sub-system.

14. The method of claim 8, further comprising semantically labeling the plurality of sub-systems by selecting a human-readable label for an equipment subsystem of the plurality of sub-systems based on at least one equipment component of the equipment subsystem.

15. A non-transitory machine-readable medium encoded with instructions for execution by a processor for controlling a controlled system, the non-transitory machine-readable medium comprising:
    instructions for receiving a definition of an equipment graph representing a plurality of controllable devices;
    instructions for processing the equipment graph to identify a plurality of equipment sub-systems within the equipment graph;
    instructions for identifying a set of control actions issuable to at least one of the plurality of controllable devices for controlling at least one of the plurality of equipment sub-systems; and
    instructions for issuing control actions from the set of control actions to the at least one of the plurality of controllable devices.

16. The non-transitory machine-readable medium of claim 15, wherein the instructions for receiving the definition of an equipment graph comprise instructions for receiving a drawing file descriptive of the plurality of controllable devices.

17. The non-transitory machine-readable medium of claim 15, wherein the instructions for receiving the definition of an equipment graph comprise instructions for receiving via a user interface a manual definition of the equipment graph from the user.

18. The non-transitory machine-readable medium of claim 17, wherein the user interface provides an equipment object library to the user for selection of equipment objects to build the equipment graph.

19. The non-transitory machine-readable medium of claim 15, wherein the instructions for identifying a set of control actions comprise instructions for precomputing a state space for the plurality of equipment sub-systems.

20. The non-transitory machine-readable medium of claim 15, wherein the instructions for processing the equipment graph comprise instructions for identifying the plurality of equipment sub-systems including:
   identifying a source component in the equipment graph;
   identifying a sink component in the equipment graph;
   finding a path from the source component through at least one transport component to the sink component in the equipment graph; and
   designating the source component, the sink component, and the at least one transport component as an equipment sub-system.

\* \* \* \* \*